(12) United States Patent
Inose et al.

(10) Patent No.: US 11,300,233 B2
(45) Date of Patent: Apr. 12, 2022

(54) THREADED CONNECTION FOR STEEL PIPE

(71) Applicants: Nippon Steel Corporation, Tokyo (JP); Vallourec Oil and Gas France, Aulnoye-Aymeries (FR)

(72) Inventors: Keita Inose, Tokyo (JP); Masaaki Sugino, Tokyo (JP); Hikari Nakano, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 200 days.

(21) Appl. No.: 16/759,370

(22) PCT Filed: Oct. 26, 2018

(86) PCT No.: PCT/JP2018/039964
§ 371 (c)(1),
(2) Date: Apr. 27, 2020

(87) PCT Pub. No.: WO2019/093163
PCT Pub. Date: May 16, 2019

(65) Prior Publication Data
US 2020/0278057 A1    Sep. 3, 2020

(30) Foreign Application Priority Data

Nov. 9, 2017  (JP) .............................. JP2017-216689

(51) Int. Cl.
*F16L 15/04*  (2006.01)
(52) U.S. Cl.
CPC .................... *F16L 15/04* (2013.01)
(58) Field of Classification Search
CPC ...... F16L 15/002; F16L 15/04; E21B 17/0423
See application file for complete search history.

(56) References Cited

U.S. PATENT DOCUMENTS

| 4,662,659 A | 5/1987 | Blose et al. |
| 2004/0155465 A1 | 8/2004 | Noel et al. |

(Continued)

FOREIGN PATENT DOCUMENTS

| JP | S59155686 A | 9/1984 |
| JP | S60500457 A | 4/1985 |

(Continued)

OTHER PUBLICATIONS

English Abstract and Family List of WO2015194160A.
(Continued)

*Primary Examiner* — David Bochna
(74) *Attorney, Agent, or Firm* — Banner & Witcoff, Ltd.

(57) ABSTRACT

A threaded connection for steel pipes is provided that exhibits improved sealability against the external pressure while maintaining the sealability against the internal pressure. A threaded connection for steel pipes includes a pin and a box. The pin includes a nose, a tapered inner male thread, a tapered outer male thread, a pin inner sealing surface, a pin intermediate shoulder surface, a pin intermediate sealing surface, and a pin annular portion. The box includes a recess corresponding to the nose, a tapered inner female thread, a tapered outer female thread, a box inner sealing surface, a box intermediate shoulder surface, a box intermediate sealing surface, and a box annular portion. The threaded connection satisfies expressions (1) and (2), provided below. $\alpha 1$ is a taper slope of the inner male thread, and $\alpha 2$ is a taper slope of the outer male thread.

$$\alpha 1 > \alpha 2, \text{ and} \quad (1)$$

$$0.5 \leq \frac{L1\alpha 1}{L2\alpha 2} \leq 1.2 \quad (2)$$

(Continued)

In expression (2), L1 is a distance between the tip of the pin and the pin intermediate shoulder surface as measured along the pipe-axis direction when the pin and box have not been made up, and L2 is a distance between the box intermediate shoulder surface and the tip of the box as measured along the pipe-axis direction when the pin and box have not been made up.

6 Claims, 3 Drawing Sheets

(56) References Cited

U.S. PATENT DOCUMENTS

| | | | |
|---|---|---|---|
| 2014/0084582 A1* | 3/2014 | Elder | F16L 15/002 |
| | | | 285/334 |
| 2017/0101830 A1* | 4/2017 | Inose | F16L 15/002 |
| 2018/0223606 A1* | 8/2018 | Rueda | E21B 17/0423 |
| 2018/0313168 A1 | 11/2018 | Sugino et al. | |
| 2018/0363813 A1* | 12/2018 | Inose | F16L 15/002 |
| 2019/0040978 A1* | 2/2019 | Oku | E21B 17/0423 |

FOREIGN PATENT DOCUMENTS

| | | |
|---|---|---|
| JP | S62502983 A | 11/1987 |
| JP | H1089554 A | 4/1998 |
| WO | 2015194160 A1 | 12/2015 |
| WO | 2017069030 A1 | 4/2017 |
| WO | 2017104282 A1 | 6/2017 |

OTHER PUBLICATIONS

English Abstract and Family List of JPH1089554A.
English Abstract and Family List of WO2017104282A.
English Abstract and Family List of JPS62502983A.
English Abstract and Family List of JPS60500457A.
English Abstract and Family List of JPS59155686A.

* cited by examiner

THREADED CONNECTION FOR STEEL PIPE

RELATED APPLICATION DATA

This application is a National Stage Application under 35 U.S.C. 371 of PCT application number PCT/JP2018/039964 designating the United States and filed Oct. 26, 2018 which claims the benefit of JP application number 2017-216689 and filed Nov. 9, 2017 each of which are hereby incorporated by reference in their entireties.

TECHNICAL FIELD

The present disclosure relates to a threaded connection used for connecting steel pipes.

BACKGROUND ART

An oil-well pipe, such as casing or tubing, is used for mining underground resources in oil wells or natural-gas wells (hereinafter collectively referred to as "oil wells" or the like). An oil-well pipe is constructed by connecting a series of steel pipes, where connection is established by threaded connections.

Such threaded connections for steel pipes are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of the steel pipe is screwed into a female thread of the coupling such that they are made up and connected. An integral connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and thus are tubular in shape.

In recent years, the development of deep wells, which present harsh environments with high pressure and high temperature, has become increasingly common, and threaded connections for oil-well pipes used in such wells are required to have further improved sealability. Particularly, tensile/compressive loads and external pressures in deep wells are high, which requires improvement in the sealability against the external pressure under tensile/compressive load.

A threaded connection for oil-well pipes exhibits high sealability at its seals. Typically, the diameter of a sealing portion of the pin is larger than the diameter of the corresponding sealing portion of the box. Thus, when the connection has been made up, both sealing portions tightly contact with each other to achieve an interference fit, forming a seal by metal-to-metal contact. The difference between the diameter of the sealing portion of the pin and the diameter of the sealing portion of the box is known as "seal interference". The larger the seal interference, the larger the seal contact force, which means better sealability.

To improve the sealability against the external pressure, it is effective to increase the wall thickness of the sealing portion of the pin, on which the external pressure acts. This increases the diameter-reduction resistance of the sealing portion of the pin upon application of the external pressure to the threaded connection, which reduces the decrease in the substantial seal interference, reducing the decrease in the seal contact force. In addition, appropriate lengths of the threads and appropriate areas of the shoulder surfaces are needed to allow the connection to exhibit stable sealability even under high tensile/compressive load.

WO 2015/194160 (Patent Document 1) discloses a threaded connection for steel pipes with improved sealability against the internal and external pressures (see paragraph 0020). This threaded connection includes, starting from the tip of the pin (i.e. pipe end of the oil-well pipe body): shoulder surfaces; first sealing surfaces; first male/female threads; auxiliary shoulder surfaces; annular portions; second sealing surfaces; and second male/female threads (see paragraph 0063 and FIG. 6).

JP Hei10(1998)-89554 A (Patent Document 2) discloses a slim-type threaded connection for oil-well pipes in which only the torque shoulders have high strength and which provides good compression resistance and good corrosion resistance (see paragraph 0016). This threaded connection is an integral threaded connection for oil-well pipes including threads for screwably fastening the pin and box, seals for providing a certain sealability against the internal pressure or external pressure or both on the oil-well pipes, and torque shoulders for controlling make-up torque, where the strength of the torque shoulders is larger than that of the other portions of the connection or that of the oil-well pipe body (see paragraph 0018 and FIG. 1).

The following prior art documents are incorporated herein by reference.

[Patent Document 1] WO 2015/194160
[Patent Document 2] JP Hei10(1998)-89554 A
[Patent Document 3] WO 2017/104282 A

SUMMARY OF THE DISCLOSURE

An object of the present disclosure is to provide a threaded connection for steel pipes with improved sealability against the external pressure while maintaining the sealability against the internal pressure.

In the threaded connections discussed above, a desired sealability cannot be provided by simply arranging sealing surfaces, shoulder surfaces, threads and other elements. To provide a desired sealability, the present inventors newly found that, in an oil-well pipe with limited wall thicknesses, the thicknesses of the various elements must be designed in a well-balanced manner, and, based on this finding, invented the threaded connection for steel pipes described below.

A threaded connection for steel pipe according to the present disclosure includes a tubular pin and a tubular box adapted to be made up on the pin as the pin is screwed in. The pin includes a nose, a tapered inner male thread, a tapered outer male thread, a pin inner sealing surface, a pin intermediate shoulder surface, a pin intermediate sealing surface, and a pin annular portion. The nose is provided at a tip portion of the pin. The inner male thread is located close to a tip of the pin, the inner male thread is provided on an outer periphery of the pin. The outer male thread is located close to a body of the steel pipe, the outer male thread is provided on the outer periphery of the pin. The pin inner sealing surface is provided between the nose and the inner male thread. The pin intermediate shoulder surface is provided between the inner male thread and the outer male thread. The pin intermediate sealing surface is provided between the outer male thread and the pin intermediate shoulder surface. The pin annular portion is provided between the pin intermediate shoulder surface and the pin intermediate sealing surface. The box includes a recess, a tapered inner female thread, a tapered outer female thread, a box inner sealing surface, a box intermediate shoulder surface, a box intermediate sealing surface, and a box annular portion. The recess corresponds to the nose. The inner female thread is corresponding to the inner male thread, the inner female thread is provided on an inner periphery of the box. The outer female thread is corresponding to the outer male thread, the outer female thread is provided on the inner periphery of the box. The box inner sealing surface faces the pin inner sealing surface, the box inner sealing surface is in contact with the pin inner sealing surface when the pin and the box have been made up. The box intermediate shoulder surface faces the pin intermediate shoulder surface, the box intermediate shoulder surface is in contact with the pin intermediate shoulder surface when the pin and the box have been made up. The box intermediate sealing surface faces the pin intermediate sealing surface, the box intermediate sealing surface is in contact with the pin intermediate sealing surface when the pin and the box have been made up. The box annular portion faces the pin annular portion, the box annular portion is apart from the pin annular portion when the pin and the box have been made up.

The threaded connection for steel pipe satisfies the following expressions (1) and (2):

$$\alpha 1 > \alpha 2 \qquad (1).$$

In expression (1), α1 is a taper slope of the inner male thread. α2 is a taper slope of the outer male thread.

$$0.5 \leq \frac{L1\alpha 1}{L2\alpha 2} \leq 1.2. \qquad (2)$$

In expression (2), L1 is a distance between the tip of the pin and the pin intermediate shoulder surface as measured along the pipe-axis direction when the pin and the box have not been made up, and L2 is a distance between the box intermediate shoulder surface and the tip of the box as measured along the pipe-axis direction when the pin and the box have not been made up.

EMBODIMENTS FOR CARRYING OUT THE INVENTION

Figure 1:
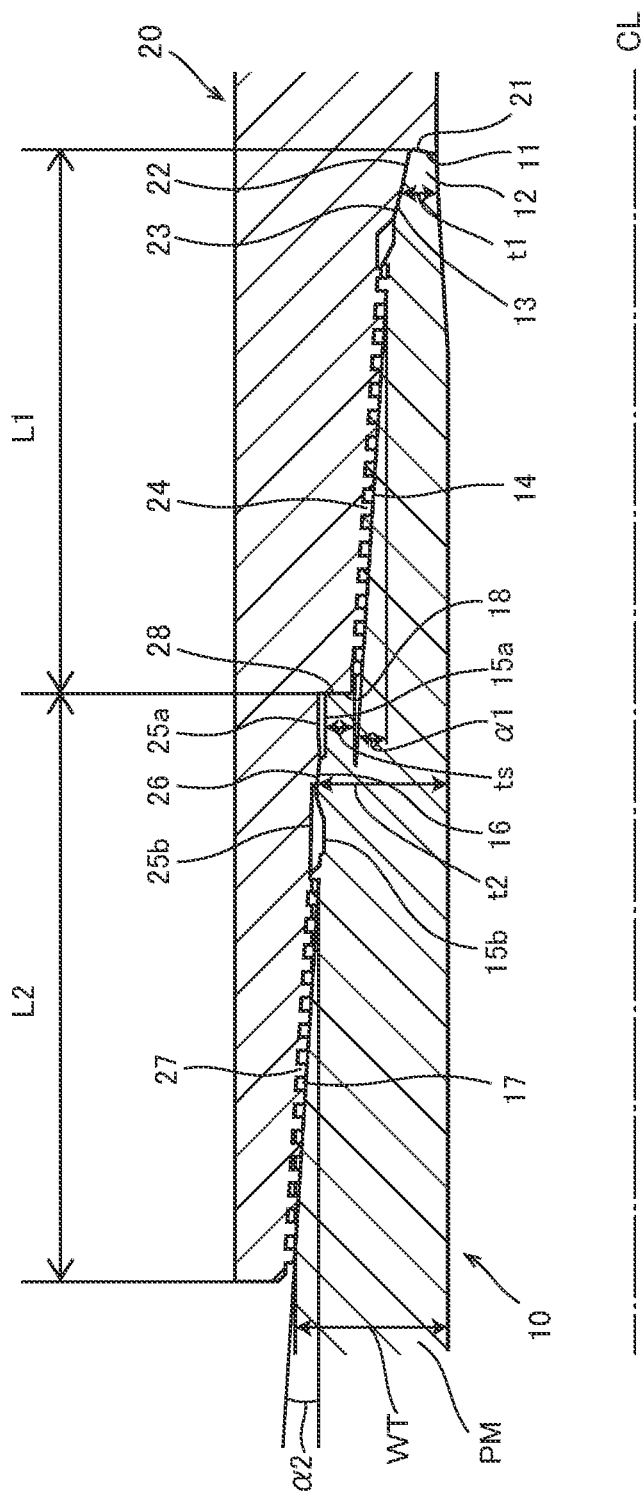
FIG. 1 is a longitudinal cross-sectional view of a threaded connection for steel pipes according to a first embodiment.

A threaded connection for steel pipe according to the present embodiment includes a tubular pin and a tubular box adapted to be made up on the pin as the pin is screwed in. The pin includes a nose, a tapered inner male thread, a tapered outer male thread, a pin inner sealing surface, a pin intermediate shoulder surface, a pin intermediate sealing surface, and a pin annular portion. The nose is provided at a tip portion of the pin. The inner male thread is located close to a tip of the pin, the inner male thread is provided on an outer periphery of the pin. The outer male thread is located close to a body of the steel pipe, the outer male thread is provided on the outer periphery of the pin. The pin inner sealing surface is provided between the nose and the inner male thread. The pin intermediate shoulder surface is provided between the inner male thread and the outer male thread. The pin intermediate sealing surface is provided between the outer male thread and the pin intermediate shoulder surface. The pin annular portion is provided between the pin intermediate shoulder surface and the pin intermediate sealing surface. The box includes a recess, a tapered inner female thread, a tapered outer female thread, a box inner sealing surface, a box intermediate shoulder surface, a box intermediate sealing surface, and a box annular portion. The recess corresponds to the nose. The inner female thread is corresponding to the inner male thread, the inner female thread is provided on an inner periphery of the box. The outer female thread is corresponding to the outer male thread, the outer female thread is provided on the inner periphery of the box. The box inner sealing surface faces the pin inner sealing surface, the box inner sealing surface is in contact with the pin inner sealing surface when the pin and the box have been made up. The box intermediate shoulder surface faces the pin intermediate shoulder surface, the box intermediate shoulder surface is in contact with the pin intermediate shoulder surface when the pin and the box have been made up. The box intermediate sealing surface faces the pin intermediate sealing surface, the box intermediate sealing surface is in contact with the pin intermediate sealing surface when the pin and the box have been made up. The box annular portion faces the pin annular portion, the box annular portion is apart from the pin annular portion when the pin and the box have been made up.

The threaded connection for steel pipe satisfies the following expression (1):

$$\alpha 1 > \alpha 2 \qquad (1).$$

In expression (1), α1 is a taper slope of the inner male thread. α2 is a taper slope of the outer male thread.

Preferably, the threaded connection for steel pipe satisfies the following expression (2):

$$0.5 \leq \frac{L1\alpha 1}{L2\alpha 2} \leq 1.2. \qquad (2)$$

In expression (2), L1 is a distance between the tip of the pin and the pin intermediate shoulder surface as measured along the pipe-axis direction when the pin and the box have not been made up, and L2 is a distance between the box intermediate shoulder surface and the tip of the box as measured along the pipe-axis direction when the pin and the box have not been made up.

Preferably, the pin further includes: a pin inner shoulder surface provided on the tip of the pin. The box further includes: a box inner shoulder surface facing the pin inner shoulder surface.

More preferably, the pin inner shoulder surface is in contact with the box inner shoulder surface when the pin and the box have been made up.

Further, the threaded connection for steel pipe satisfies the following expression (3):

$$\frac{A1}{A0} \geq 0.3. \quad (3)$$

In expression (3), A0 is a cross-sectional area of the body of the steel pipe along a plane perpendicular to the pipe axis, and A1 is a projected area of the box intermediate shoulder surface on a plane perpendicular to the pipe axis.

Alternatively, the threaded connection for steel pipe satisfies the following expression (4):

$$\frac{A2}{A0} \geq 0.3. \quad (4)$$

In expression (4), A0 is a cross-sectional area of the body of the steel pipe along a plane perpendicular to the pipe axis, and A2 is a total of the projected area of the pin inner shoulder surface and the projected area of the pin intermediate shoulder surface on a plane perpendicular to the pipe axis.

Now, the present embodiment will be described in detail with reference to the drawings. The same or corresponding portions in the drawings are labeled with the same characters, and their description will not be repeated.

[Construction of Threaded Connection for Steel Pipes]

Referring to FIG. 1, the threaded connection for steel pipes according to the present embodiment is a coupling-type threaded connection, including: a tubular pin 10; and a tubular box 20 adapted to be made up on the pin 10 as the pin 10 is screwed in.

The pin 10 includes a nose 12, a tapered inner male thread 14, a tapered outer male thread 17, a pin inner sealing surface 13, a pin intermediate shoulder surface 18, a pin intermediate sealing surface 16, and a pin annular portion 15a.

The nose 12 is provided at a tip portion of the pin 10. The inner male thread 14 is located close to the tip of the pin and provided on the outer periphery of the pin 10. The outer male thread 17 is located close to the body PM of the associated steel pipe and is provided on the outer periphery of the pin 10. Body PM of a steel pipe means the portion of the steel pipe other than the pin 10. The pin inner sealing surface 13 is provided between the nose 12 and inner male thread 14. The pin intermediate shoulder surface 18 is provided between the inner male thread 14 and outer male thread 17. The pin intermediate sealing surface 16 is provided between the outer male thread 17 and pin intermediate shoulder surface 18. The pin annular portion 15a is provided between the pin intermediate shoulder surface 18 and pin intermediate sealing surface 16.

The box 20 includes a recess 22, a tapered inner female thread 24, a tapered outer female thread 27, a box inner sealing surface 23, a box intermediate shoulder surface 28, a box intermediate sealing surface 26, and a box annular portion 25a.

The recess 22 corresponds to the nose 12. The inner female thread 24 corresponds to the inner male thread 14 and is provided on the inner periphery of the box 20. The outer female thread 27 corresponds to the outer male thread 17 and is provided on the inner periphery of the box 20. The box inner sealing surface 23 faces the pin inner sealing surface 13, and is in contact with the pin inner sealing surface 13 when the pin 10 and box 20 have been made up. The box intermediate shoulder surface 28 faces the pin intermediate shoulder surface 18, and is in contact with the pin intermediate shoulder surface 18 when the pin 10 and box 20 have been made up. The box intermediate sealing surface 26 faces the pin intermediate sealing surface 16, and is in contact with the pin intermediate sealing surface 16 when the pin 10 and box 20 have been made up. The box annular portion 25a faces the pin annular portion 15a, and is apart from the pin annular portion 15a when the pin 10 and box 20 have been made up.

The threaded connection for steel pipes satisfies the following expression (1):

$$\alpha1 > \alpha2 \quad (1).$$

In expression (1), $\alpha1$ is a taper slope of the inner male thread 14. $\alpha2$ is a taper slope of the outer male thread 17.

In implementations where the thread roots are parallel to the respective thread tapers, the taper slope $\alpha1$ is the slope that appears on a longitudinal cross section of the pin 10 containing the pipe axis CL and that is formed between a straight line connecting the roots of the inner male thread 14 and the pipe axis CL (or a straight line parallel thereto). The taper slope $\alpha2$ is the slope that appears on a longitudinal cross section of the pin 10 containing the pipe axis CL and that is formed between a straight line connecting the roots of the outer male thread 17 and the pipe axis CL (or a straight line parallel thereto).

In implementations where the thread roots are parallel to the pipe axis CL, the taper slope $\alpha1$ is the slope that appears on a longitudinal cross section of the pin 10 containing the pipe axis CL and that is formed between a straight line connecting the points of intersection of extension lines of the roots of the inner male thread 14 and extension lines of the load flanks, on one hand, and the pipe axis CL (or a straight line parallel thereto), on the other. The taper slope $\alpha2$ is the slope that appears on a longitudinal cross section of the pin 10 containing the pipe axis CL and that is formed between a straight line connecting the points of intersection of extension lines of the roots of the outer male thread 17 and extension lines of the load flanks, on one hand, and the pipe axis CL (or a straight line parallel thereto), on the other.

The inner male thread 14 and inner female thread 24 may be hereinafter collectively referred to as "inner threads 14 and 24". The outer male thread 17 and outer female thread 27 may be collectively referred to as "outer threads 17 and 27".

Each of the pin inner sealing surface 13 and pin intermediate sealing surface 16 has the shape of a face equivalent to the periphery of a truncated cone decreasing in diameter toward the tip, or the shape obtained by combining the periphery of such a truncated cone and a face equivalent to the periphery of a solid of revolution obtained by rotating a curve such as an arc about the pipe axis CL.

The nose 12 is tubular in shape and extends immediately from the pin inner sealing surface 13 in the direction of the pipe axis CL. Alternatively, the outer periphery of the nose 12 may be a tapered surface with a slope equal to, or smaller (i.e. slow taper) or larger (i.e. fast taper) than, that of the taper of the pin inner sealing surface 13. More exactly, in implementations where the outer periphery of the nose 12 is a tapered surface, the outer periphery has the shape of a face equivalent to the periphery of a truncated cone decreasing in diameter toward the tip, or the shape obtained by combining the periphery of such a truncated cone and a face equivalent to the periphery of a solid of revolution obtained by rotating a curve such as an arc about the pipe axis CL.

The pin 10 further includes a pin inner shoulder surface 11 on the tip of the pin 10. The box 20 further includes a box inner shoulder surface 21 to face the pin inner shoulder surface 11. The pin inner shoulder surface 11 is in contact with the box inner shoulder surface 21 when the pin 10 and box 20 have been made up.

The pin inner shoulder surface 11 is an annular surface generally perpendicular to the pipe axis CL. More exactly, the inner shoulder surface 11 is slightly inclined such that its outer periphery is located further toward the tip of the pin 10.

The intermediate shoulder surface 18 is located between the inner male thread 14 and pin annular portion 15a. The intermediate shoulder surface 18 extends immediately from the pin annular portion 15a. In the present embodiment, the intermediate shoulder surface 18 is an annular surface perpendicular to the pipe axis CL. Alternatively, similar to the inner shoulder surface 11, the intermediate shoulder surface 18 may be slightly inclined such that its outer periphery is located further toward the tip of the pin 10.

The pin annular portion 15a extends immediately from the pin intermediate sealing surface 16 forwardly in the direction of the pipe axis CL. The inner male thread 14 immediately extends from the pin annular portion 15a. The pin annular portion 15b extends immediately from the pin intermediate sealing surface 16 rearwardly in the direction of the pipe axial CL. The outer male thread 17 extends immediately from the pin annular portion 15b. The outer periphery of the pin annular portion 15a may take any shape that ensures rigidity, and may be a cylindrical surface or a tapered surface with a slope smaller (i.e. slow taper) than that of the thread taper of the inner male thread 14, or may be a curved surface. The same applies to the outer periphery of the pin annular portion 15b.

The box inner sealing surface 23 protrudes toward the pin inner sealing surface 13. Alternatively, the box inner sealing surface 23 may not protrude. In such implementations, the pin inner sealing surface 13 protrudes toward the box inner sealing surface 23.

The inner male thread 14 and inner female thread 24 are tapered threads, and are trapezoidal threads. The outer male thread 17 and outer female thread 27 are also tapered threads, and are also trapezoidal threads.

The tapered surfaces of the inner threads 14 and 24 are located closer to the pipe axis CL than the tapered surfaces of the outer threads 17 and 27 are, because the intermediate shoulder surfaces 18 and 28 are present between the inner threads 14 and 24 on one hand and the outer threads 17 and 27 on the other. Thus, the portions of the pin 10 that are provided with the inner male thread 14 and pin inner sealing surface 13 have relatively small outer diameters and thus relatively small wall thicknesses. On the other hand, the portions of the pin 10 that are provided with the pin intermediate sealing surface 16 and outer male thread 17 have relatively large outer diameters and thus relatively large wall thicknesses.

The inner male thread 14 and inner female thread 24 enable screwing into each other such that, when the connection has been made up, they can tightly contact with each other to achieve an interference fit. Similarly, the outer male thread 17 and outer female thread 27 can achieve an interference fit.

As the pin 10 is screwed in, the inner sealing surfaces 13 and 23 contact each other and the intermediate sealing surfaces 16 and 26 contact each other and, when the connection has been made up, they tightly contact to achieve an interference fit. Thus, the inner sealing surfaces 13 and 23 and intermediate sealing surfaces 16 and 26 form the inner seal and intermediate seal, respectively, through metal-to-metal contact.

When the connection has been made up, a gap (not shown) is formed between the nose 12 of the pin 10 and the recess 22 of the box 20. A gap is also formed between the pin annular portion 15a and box annular portion 25a. A gap is also formed between the pin annular portion 15b and box annular portion 25b.

When the connection has been made up, the inner shoulder surfaces 11 and 21 are pressed together and are in contact with each other. The press contact between the inner shoulder surfaces 11 and 21 applies thread-tightening axial forces mainly to load flanks of the inner male thread 14. When the connection has been made up, the intermediate shoulder surfaces 18 and 28 are in contact with each other. When the intermediate shoulder surfaces 18 and 28 are in press contact, this applies thread-tightening axial forces mainly to load flanks of the outer male thread 17.

The threaded connection for steel pipes also satisfies the following expression (2):

$$0.5 \leq \frac{L1\alpha1}{L2\alpha2} \leq 1.2. \tag{2}$$

In expression (2), L1 is a distance between the tip of the pin 10 and the pin intermediate shoulder surface 18 as measured along the direction of the pipe axis CL when the pin 10 and box 20 have not been made up. L2 is a distance between the box intermediate shoulder surface 28 and the tip of the box 20 as measured along the direction of the pipe axis CL when the pin 10 and box 20 have not been made up.

The effects of the taper slopes $\alpha1$ and $\alpha2$ of the inner threads 14 and 24 and outer threads 17 and 27 will now be discussed. For a constant length of the inner threads 14 and 24 and for a constant length of the outer threads 17 and 27, the wall thickness of the pin 10 as measured at the pin intermediate sealing surface 18 for $\alpha1 > \alpha2$ can be increased relative to that for $\alpha1 = \alpha2$, thereby improving the sealability against the external pressure. On the other hand, the wall thickness of the pin 10 as measured at the pin intermediate sealing surface 18 for $\alpha1 < \alpha2$ is smaller than that for $\alpha1 = \alpha2$, which decreases the sealability against the external pressure.

The effects of the lengths of the inner threads 14 and 24 and outer threads 17 and 27 will now be discussed. If it is assumed that the wall thickness of the body PM of the steel pipe is denoted by WT, the wall thickness of the pin 10 as measured at the pin inner sealing surface 13 is denoted by t1, the wall thickness of the pin 10 as measured at the pin intermediate sealing surface 16 is denoted by t2, and the height of the pin intermediate shoulder surface 18 as measured in the pipe's radial direction is denoted by ts, then, the relationships given by the following expressions (5) and (6), can be obtained. Here, X1 and X2 are constants representing small changes in wall thickness, such as changes caused by internal machining performed on portions located inward of the inner sealing surfaces 13 and 23 or changes in the wall thickness of portions near the inner sealing surfaces 13 and 23.

$$WT = t1 + L1\alpha1 + ts + L2\alpha2 + X1 \tag{5}$$

and $$t2 = t1 + L1\alpha1 + ts + X2 \tag{6}$$

To increase the sealability against the external pressure, it is necessary to maximize the wall thickness t2 to reduce the amount of diameter reduction caused by the external pressure and thus to prevent the substantial seal contact force from decreasing when the external pressure is applied. The wall thickness t1 needs to be above a certain value because, if the wall thickness of the connection portions provided with the inner sealing surfaces 13 and 23, on which no external pressure acts, is too small, sufficient fitting forces cannot be provided. Further, the height ts needs to be above a certain value to provide a certain compression resistance. Thus, to maximize the wall thickness t2 based on expressions (5) and (6) for a constant wall thickness t1 and for a constant height ts, L1α1 is suitably maximized and L2α2 is suitably minimized. An external-pressure sealability parameter, S, is defined by the following expression, (7).

$$S = \frac{L1\alpha1}{L2\alpha2} \qquad (7)$$

Then, if the parameter S is larger than a certain value, a sufficient wall thickness t2 is provided, thereby providing good sealability against the external pressure.

On the other hand, if the parameter S is too large, the engagement between the outer threads 17 and 27 decreases such that, upon application of the external pressure, the connection portions provided with the outer threads 17 and 27 and those with the intermediate sealing surfaces 16 and 26 tend to decrease in diameter.

To provide a sufficient fitting contact at the seal, the wall thickness t1 is preferably not smaller than 4 mm. Further, to provide a sufficient compression resistance, the height ts is preferably not smaller than 4 mm. Furthermore, to prevent jump-out (i.e. disengagement of threads or a thread coming out of another due to shear fracture) upon application of an excessive tensile load, it is preferable that the following expression, (8), be satisfied:

$$(L1+L2)/OD > 1 \qquad (8).$$

In expression (8), OD is an outer diameter of the steel pipe.

Further, providing the pin inner shoulder surface 11 on the tip of the pin 10 may reduce damage caused by a compression load, and is expected to further improve performance.

Preferred implementations of the threaded connection according to the present embodiment will now be described as a supplement.

It is assumed that, in the pin 10, the cross-sectional area of the steel-pipe body along a plane perpendicular to the pipe axis CL is denoted by A0 and the projected area of the box intermediate shoulder surface 28 on a plane perpendicular to the pipe axis CL is denoted by A1. Then, the area ratio between them, A1/A0, is preferably not smaller than 0.3. More preferably, A1/A0 is not smaller than 0.35. The reasons therefor are as follows: A1/A0 essentially depends on the area of the box intermediate shoulder surface 28. If A1/A0 is small, this means that the area of the box intermediate shoulder surface 28 is small; then, if an excessive compression load is applied to the threaded connection, the box intermediate shoulder surface 28 cannot withstand this compression load. If this occurs, the pin intermediate shoulder surface 18 and the pin portions immediately extending therefrom, i.e. the pin annular portion 15a and pin intermediate sealing surface 16, plastically deform, resulting in unstable contact between the intermediate sealing surfaces 16 and 26. As a result, the contact pressure between the intermediate sealing surfaces 16 and 26 may decrease. In view of this, it is preferred that the area ratio of the intermediate shoulder to the steel-pipe body, A1/A0, be larger than a certain value.

No particular upper limit is specified for the area ratio A1/A0 of the intermediate shoulder to the steel-pipe body. Nevertheless, if A1/A0 is too large, it is difficult to provide a certain engagement length between the inner threads 14 and 24 and a certain engagement length between the outer threads 17 and 27. In view of this, for practical reasons, the area ratio of the total shoulder area relative to the steel-pipe body A1/A0 is preferably not larger than 60%.

It is assumed that, in the pin 10, the cross-sectional area of the steel-pipe body along a plane perpendicular to the pipe axis CL is denoted by A0, and the total of the projected areas of the pin inner shoulder surface 11 and pin intermediate shoulder surface 18 on a plane perpendicular to the pipe axis CL (i.e. total shoulder area) is denoted by A2. In this case, the area ratio between them, A2/A0, is preferably not smaller than 0.3. More preferably, A2/A0 is not smaller than 0.35. The reasons therefor are as follows: A2/A0 essentially depends on the area of the pin inner shoulder 11 and the area of the pin intermediate shoulder surface 18. If A2/A0 is small, this means that the area of the pin inner shoulder 11 and the area of the pin intermediate shoulder surface 18 are small; then, if an excessive compression load is applied to the threaded connection, the pin inner shoulder 11 and pin intermediate shoulder surface 18 cannot withstand this compression load. If this occurs, the pin inner shoulder surface 11 and the pin portions extending immediately therefrom, i.e. the nose 12 and pin inner sealing surface 13, plastically deform, resulting in unstable contact between the inner sealing surfaces 13 and 23. At the same time, the pin intermediate shoulder surface 18 and the pin portions extending immediately therefrom, i.e. the pin annular portion 15a and pin intermediate sealing surface 16, plastically deform, resulting in unstable contact between the intermediate sealing surfaces 16 and 26. As a result, the contact pressure between the inner sealing surfaces 13 and 23 and the contact pressure between the intermediate sealing surfaces 16 and 26 may decrease. In view of this, it is preferred that the area ratio of the total shoulder area relative to the steel-pipe body, A2/A0, be larger than a certain value.

No particular upper limit is specified for the area ratio A2/A0 of the total shoulder area relative to the steel-pipe body. Nevertheless, if A2/A0 is too large, it is difficult to provide a certain engagement length between the inner threads 14 and 24 and a certain engagement length between the outer threads 17 and 27. In view of this, for practical reasons, the area ratio of the total shoulder area relative to the steel-pipe body A2/A0 is preferably not larger than 60%.

No particular upper limit is specified for the outer diameter of the pin annular portion 15a. Nevertheless, the outer diameter of the pin annular portion 15a must be such that, during make-up, the pin annular portion does not interfere with the box intermediate sealing surface 26.

In the pin 10, the length of the pin annular portion 15a as measured in the pipe axis is preferably one or more times the thread pitch of the outer male thread 17 as measured starting from the front end of the pin intermediate sealing surface 16. If the length of the pin annular portion 15a is small, upon application of the external pressure to the threaded connection, the contact pressure between the pin intermediate sealing surfaces 16 and 26 may decrease for the same reasons as for small wall thicknesses of the pin annular portion 15a.

No particular upper limit is specified for the length of the pin annular portion 15a. However, if the length of the pin annular portion 15a is too large, the entire length of the connection becomes too large, increasing the machining time and materials cost, resulting in increased manufacture costs. Further, if the length of the pin annular portion 15a is larger than a certain value, near-saturation is reached in terms of the improvement in sealability. In view of this, for practical reasons, the length of the pin annular portion 15a is preferably not larger than five times the thread pitch of the outer male thread 17.

In the pin 10, the length of the pin annular portion 15b as measured along the pipe axis is preferably one or more times the thread pitch of the outer male thread 17 as measured starting from the rear end of the pin intermediate sealing surface 16. If the length of the pin annular portion 15b is small, the substantial interference between the intermediate sealing surfaces 16 and 26 effected by the interference fit between the outer threads 17 and 27 may decrease, thereby potentially decreasing the contact pressure between the intermediate sealing surfaces 16 and 26.

No particular upper limit is specified for the length of the pin annular portion 15b. However, if the length of the pin annular portion 15b is too large, the entire length of the connection becomes too large, increasing the machining time and materials cost, resulting in increased manufacture costs. Further, if the length of the pin annular portion 15b is larger than a certain value, near-saturation is reached in terms of the improvement in sealability. In view of this, for practical reasons, the length of the pin annular portion 15b is preferably not larger than five times the thread pitch of the outer male thread 17.

In the pin 10, the length of the nose 12 as measured along the pipe axis CL is preferably not smaller than 5 mm. The reasons therefor are as follows: if the length of the nose 12 is small, when an excessive tensile load is applied to the threaded connection, the elastic recovery forces in the pin inner sealing surface 13 produced by the nose 12 may be insufficient. In such cases, the contact pressure between the inner sealing surfaces 13 and 23 may decrease. In view of this, the length of the nose 12 is preferably larger than a certain value.

No particular upper limit is specified for the length of the nose 12. However, if the length of the nose 12 is too large, the entire length of the connection becomes too large, increasing the machining time and materials cost, resulting in increased manufacture costs. Further, if the length of the nose 12 is larger than a certain value, near-saturation is reached in terms of the improvement in sealability. In view of this, for practical reasons, the length of the nose 12 is preferably not larger than five times the thread pitch of the inner male thread 14.

The present disclosure is not limited to the above-illustrated embodiments, and other various modifications are possible without departing from the spirit of the present disclosure.

Figure 2:
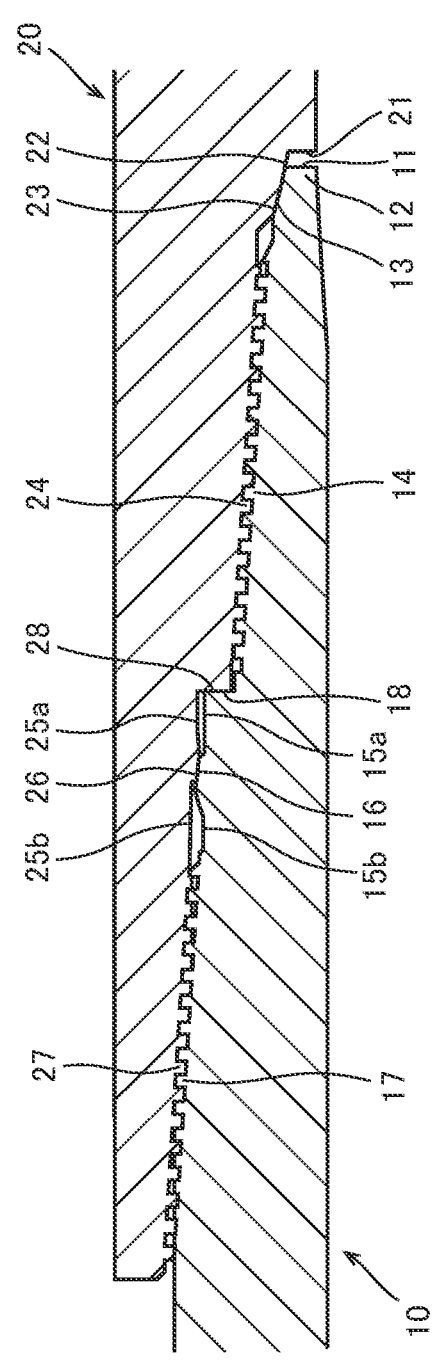
FIG. 2 is a longitudinal cross-sectional view of a threaded connection for steel pipes according to a second embodiment.

For example, as shown in FIG. 2, the pin inner shoulder surface 11 and box inner shoulder surface 21 may be separated from each other.

For example, a device may be added to reduce the tight contact between those regions of the inner threads 14 and 24 that are located close to the inner sealing surfaces 13 and 23 upon application of the internal pressure to the threaded connection. This will cause the pin portions associated with the pin inner sealing surface 13 to deform and increase in diameter more effectively, thereby amplifying the contact pressure between the inner sealing surfaces 13 and 23. This device may include an arrangement in which the portions of the inner male thread 14 or inner female thread 24 that are located close to the inner sealing surfaces 13 and 23 have imperfect thread shapes, i.e. are incomplete thread portions. In one example of this arrangement, the incomplete thread portions of the inner female thread 24 of the box 20 include thread crests that form a cylindrical surface parallel to the pipe axis CL and thread heights smaller than the regular thread heights. This will create gaps between those crests of the inner female thread 24 and those roots of the inner male thread 14 that are located in the incomplete thread portions. In this case, the total length of the incomplete thread portions is 3 to 9 times the thread pitch of the inner female thread 24 (i.e. about 15 to 45 mm).

The threaded connection according to the above-illustrated embodiment is not limited to coupling-type connections, but may be an integral connection.

EXAMPLES

To verify the effects of the threaded connection for steel pipes according to the present embodiment, a numerical simulation analysis was conducted by the elasto-plastic finite element method (FEM).

Test Conditions

Finite element analysis was performed on a plurality of samples with different external-pressure sealability parameters S ($=L1\alpha1/L2\alpha2$) to compare their performances. The samples were coupling-type threaded connections with the basic structure shown in FIG. 1. The common test conditions are provided below.

(1) Dimensions of Steel Pipes

7⅝ [inch]×1.06 [inch] (with an outer diameter of 193.68 [mm] and a wall thickness of 27.0 [mm])

(2) Grade of Steel Pipes

P110 in accordance with API standards (carbon steel with a nominal yield stress of 110 [ksi])

(3) Dimensions of Threads (Common to All Threads)

Thread pitch: 5.08 [mm]; flank angle of load flank: −3°; flank angle of stab flank: 10°; stab-flank clearance: 0.15 [mm]

To perform finite element analysis, each sample was modeled in such a way that the material was an elasto-plastic object with isotropic hardening; the elastic modulus was 210 [GPa]; and the yield strength was 110 [ksi] (=758.3 [MPa]) for 0.2% proof stress.

Evaluation Method

For each sample, the tightening of the threads was analyzed before a load simulating the ISO 13679 2011 CAL-IV Series A test was applied to evaluate the sealabilities against the external and internal pressures. The sealabilities against the external and internal pressures were evaluated based on the minimum value of the contact force per unit length measured along the circumferential direction of the inner seals during the internal-pressure cycle portions of the load history (i.e. quadrants I and II) and the contact force per unit length measured along the circumferential direction of the intermediate seals during the external-pressure cycle portions of the load history (i.e. quadrants III and IV). Larger contact forces mean better sealabilities. Sealability was evaluated using the following two levels relative to the performance of Sample #1, which is represented by "1".

○: good, i.e. the intermediate seal exhibited a contact force of 1.2 or more; and ×: unacceptable, i.e. the intermediate seal exhibited a contact force less than 1.2 or the inner seal exhibited a contact force of 0.9 or less.

Table 1 shows a summary of the test conditions and evaluations for the various samples.

TABLE 1

| Sample | Pipe dimensions | | Thread dimensions | | | | Shape parameters | | Sealability | | determination |
|---|---|---|---|---|---|---|---|---|---|---|---|
| | outer diameter, mm | wall thickness, mm | L1 | α1 | L2 | α2 | (L1 + L2)/OD | L1α1/L2α2 | internal pressure | external pressure | |
| #1 | 193.7 | 27.0 | 75.2 | 0.083 | 132.0 | 0.083 | 1.07 | 0.57 | 1.00 | 1.00 | x |
| #2 | 193.7 | 27.0 | 74.1 | 0.083 | 160.1 | 0.056 | 1.21 | 0.69 | 1.04 | 1.24 | ○ |
| #3 | 193.7 | 27.0 | 75.2 | 0.125 | 136.4 | 0.083 | 1.09 | 0.83 | 0.92 | 1.37 | ○ |
| #4 | 193.7 | 27.0 | 107.0 | 0.083 | 153.7 | 0.056 | 1.35 | 1.04 | 1.42 | 1.28 | ○ |
| #5 | 193.7 | 27.0 | 82.0 | 0.125 | 163.8 | 0.056 | 1.27 | 1.13 | 1.00 | 1.35 | ○ |
| #6 | 193.7 | 27.0 | 91.0 | 0.125 | 109.7 | 0.083 | 1.04 | 1.24 | 1.38 | 0.58 | x |
| #7 | 193.7 | 27.0 | 100.0 | 0.125 | 111.6 | 0.083 | 1.09 | 1.34 | 1.37 | 0.56 | x |

Test Results

Figure 3:
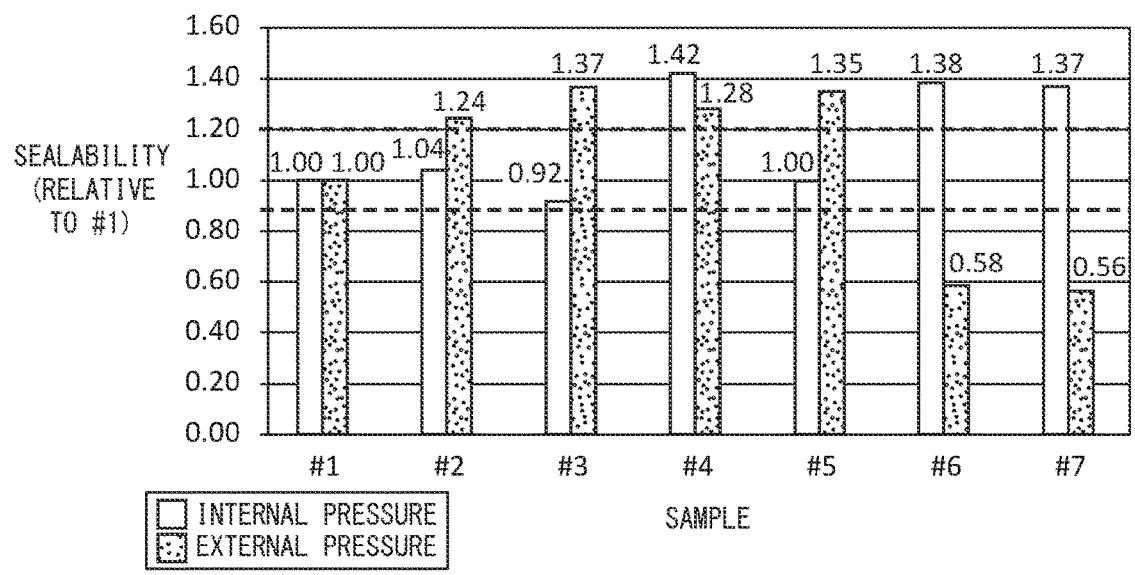
FIG. 3 graphs the sealabilities of the threaded connections of experiment examples.
Figure 4:
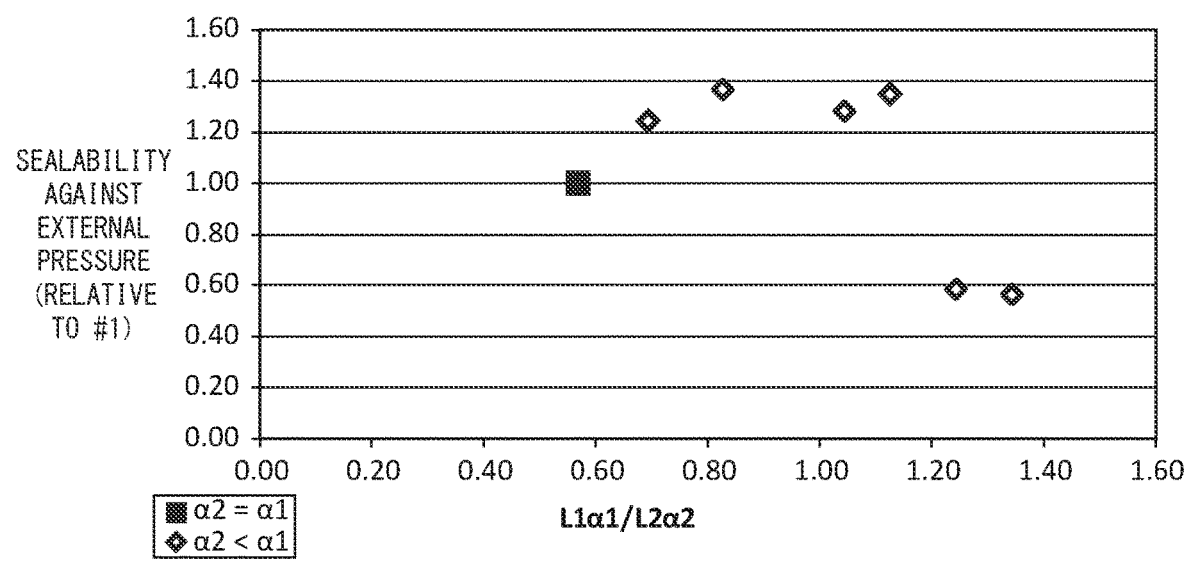
FIG. 4 graphs the external-pressure sealabilities of the threaded connections represented by FIG. 3.

Referring to FIGS. 3 and 4, Sample #1 exhibited $\alpha 1=\alpha 2$, and the wall thickness of the intermediate seal of the pin was small. As such, the diameter-reduction resistance of the pin intermediate seal against the external pressure was small, resulting in a poor sealability against the external pressure.

In Samples #2 to #5, the value of (L1+L2)/OD was larger than 1, which means that the engagement of the threads was sufficient, the tensile-load resistance was high, $\alpha 1$ was larger than $\alpha 2$, and $L1\alpha 1/L2\alpha 2$ was not less than 0.5 and not more than 1.2. As such, the wall thickness of the intermediate seal was sufficiently large, which means that the diameter-reduction resistance against the external pressure was particularly large, and the sealability against the external pressure was particularly good.

In Samples #6 to #7, $\alpha 1$ was larger than $\alpha 2$; however, $L1\alpha 1/L2\alpha 2$ was larger than 1.2 and the engagement of the outer threads was insufficient; thus, when the external pressure was applied, the intermediate seal tended to reduce its diameter. As such, the sealability against the external pressure was poor.

EXPLANATION OF REFERENCES

10: pin
11: pin inner shoulder surface
12: nose
13: pin inner sealing surface
14: inner male thread
15a and 15b: pin annular portions
16: pin intermediate sealing surface
17: outer male thread
18: pin intermediate shoulder surface
20: box
21: box inner shoulder surface
22: recess
23: box inner sealing surface
24: inner female thread
25a: box annular portion
26: box intermediate sealing surface
27: outer female thread
28: box intermediate shoulder surface

The invention claimed is:

1. A threaded connection for steel pipe, comprising:
a tubular pin; and
a tubular box adapted to be made up on the pin as the pin is screwed in,
wherein the pin includes:
a nose provided at a tip portion of the pin;
a tapered inner male thread located close to a tip of the pin, the inner male thread provided on an outer periphery of the pin;
a tapered outer male thread located close to a body of the steel pipe, the outer male thread provided on the outer periphery of the pin;
a pin inner sealing surface provided between the nose and the inner male thread;
a pin intermediate shoulder surface provided between the inner male thread and the outer male thread;
a pin intermediate sealing surface provided between the outer male thread and the pin intermediate shoulder surface; and
a pin annular portion provided between the pin intermediate shoulder surface and the pin intermediate sealing surface,
the box includes:
a recess corresponding to the nose;
a tapered inner female thread corresponding to the inner male thread, the inner female thread provided on an inner periphery of the box;
a tapered outer female thread corresponding to the outer male thread, the outer female thread provided on the inner periphery of the box;
a box inner sealing surface facing the pin inner sealing surface, the box inner sealing surface being in contact with the pin inner sealing surface when the pin and the box have been made up;
a box intermediate shoulder surface facing the pin intermediate shoulder surface, the box intermediate shoulder surface being in contact with the pin intermediate shoulder surface when the pin and the box have been made up;
a box intermediate sealing surface facing the pin intermediate sealing surface, the box intermediate sealing surface being in contact with the pin intermediate sealing surface when the pin and the box have been made up; and a box annular portion facing the pin annular portion, the box annular portion being apart from the pin annular portion when the pin and the box have been made up, the threaded connection satisfying the following expressions (1) and (2):

$$\alpha 1 > \alpha 2 \tag{1}$$

in expression (1), α1 is a taper slope of the inner male thread, and α2 is a taper slope of the outer male thread, and $$0.5 \leq \frac{L1\alpha 1}{L2\alpha 2} \leq 1.2, \tag{2}$$

in expression (2), L1 is a distance between the tip of the pin and the pin intermediate shoulder surface as measured along the pipe-axis direction when the pin and the box have not been made up, and L2 is a distance between the box intermediate shoulder surface and the tip of the box as measured along the pipe-axis direction when the pin and the box have not been made up.

2. The threaded connection for steel pipe according to claim 1, wherein the pin further includes: a pin inner shoulder surface provided on the tip of the pin, and the box further includes: a box inner shoulder surface facing the pin inner shoulder surface.

3. The threaded connection for steel pipe according to claim 2, wherein the pin inner shoulder surface is in contact with the box inner shoulder surface when the pin and the box have been made up.

4. The threaded connection for steel pipe according to claim 3, satisfying the following expression (4):

$$\frac{A2}{A0} \geq 0.3, \tag{4}$$

in expression (4), A0 is a cross-sectional area of the body of the steel pipe along a plane perpendicular to the pipe axis, and A2 is a total of the projected area of the pin inner shoulder surface and the projected area of the pin intermediate shoulder surface on a plane perpendicular to the pipe axis.

5. The threaded connection for steel pipe according to claim 2, satisfying the following expression (4):

$$\frac{A2}{A0} \geq 0.3, \tag{4}$$

in expression (4), A0 is a cross-sectional area of the body of the steel pipe along a plane perpendicular to the pipe axis, and A2 is a total of the projected area of the pin inner shoulder surface and the projected area of the pin intermediate shoulder surface on a plane perpendicular to the pipe axis.

6. The threaded connection for steel pipe according to claim 1, satisfying the following expression (3):

$$\frac{A1}{A0} \geq 0.3, \tag{3}$$

in expression (3), A0 is a cross-sectional area of the body of the steel pipe along a plane perpendicular to the pipe axis, and A1 is a projected area of the box intermediate shoulder surface on a plane perpendicular to the pipe axis.

* * * * *